UNITED STATES PATENT OFFICE.

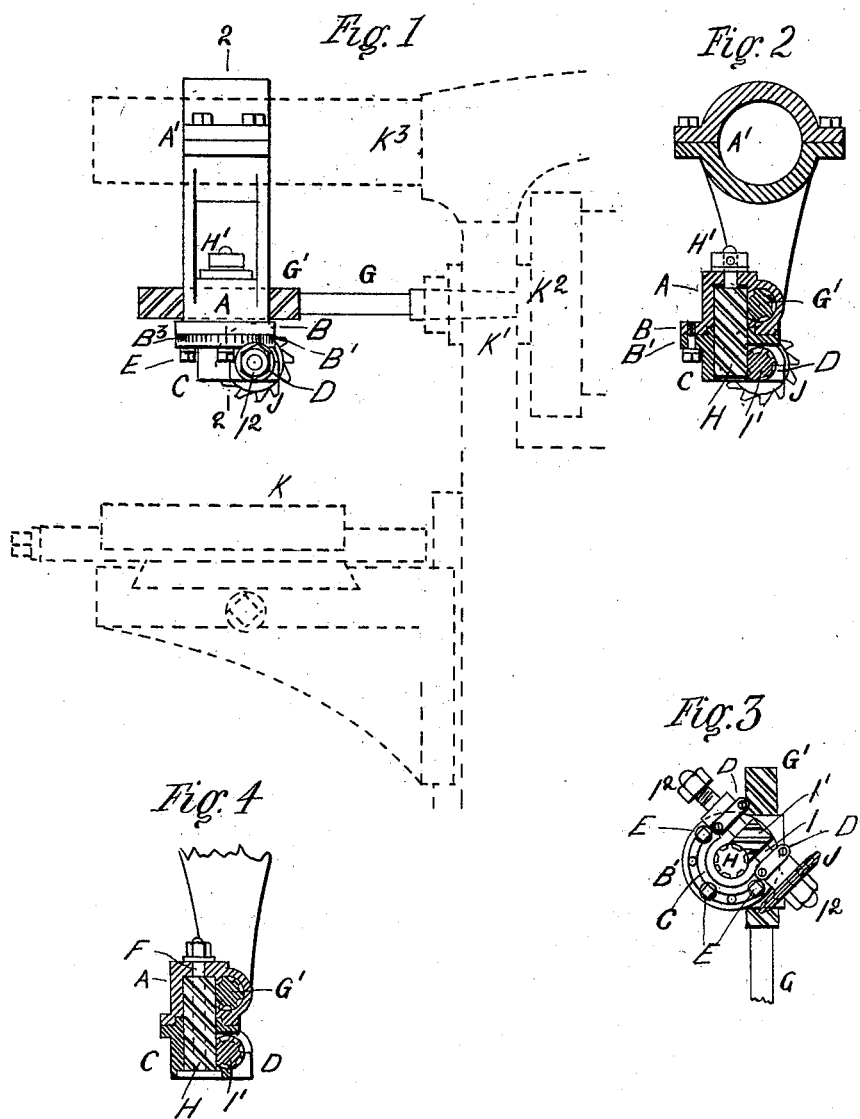

JOHN F. ARTHUR, OF NEW YORK, N. Y.

MILLING AND GEAR-CUTTING ATTACHMENT.

SPECIFICATION forming part of Letters Patent No. 608,822, dated August 9, 1898.

Application filed December 7, 1897. Serial No. 661,021. (No model.)

*To all whom it may concern:*

Be it known that I, JOHN F. ARTHUR, a citizen of the United States, and a resident of New York, (Brooklyn,) county of Kings, State of New York, have invented a certain new and useful Improvement in Milling and Gear-Cutting Attachments, of which the following is a specification.

This invention has for its object the construction of a simple and inexpensive device for attachment to plain milling and other machines, whereby they are adapted for use in the production of the more complicated milling-work, such as bevel and spiral gear cutting and other angular and irregular work which now require the use of a universal milling-machine.

The working parts of this milling and gear-cutting attachment consist of an arbor adapted to be attached to and operated by the working spindle of the machine, a cutting-tool arbor arranged so that its axis may be set in any angular position relative to the machine-arbor in a plane that is parallel to the axis of the machine-arbor, and means for transmitting motion from the machine-arbor to the cutting-tool arbor, such as an elongated spiral gear arranged to mesh into corresponding gear-teeth formed on the two arbors at all times and in whatever position the cutting-tool arbor bears to the machine-arbor. A suitable frame is provided for holding the working parts of the device, comprising two parts, one of which is formed to embrace the machine-arbor, hold the power-communicating gear, and to be firmly secured to the overhanging arm of a milling-machine or other suitable part of the main frame of the machine to which the device is attached. The other part is provided with bearings in which the cutting-tool arbor is fitted to rotate and embraces the lower part of the power-communicating gear, the two parts of the frame having circular seats coincident with the axis of the power-communicating gear, on which the lower part may be rotated and the cutting-tool arbor set in any desired angular position relative to the machine-arbor, with its gear-teeth remaining in mesh with the teeth of the communicating gear. The two parts of the frame are bolted together when set, so as to be rigidly connected, and they are cylindrical in form where they meet, the circumferences of which parts are provided with an angle-scale or index to facilitate the angular adjustment of the cutting-tool arbor.

In the accompanying drawings, to which I will now refer to more fully describe the construction and operation of my invention, Figure 1 is a side elevation of the attachment shown applied to an ordinary plain milling-machine, with the cutting-tool arbor set in position at right angles to the machine-arbor. Fig. 2 is a vertical section of the attachment, taken on line 2 2, Fig. 1, but with the cutting-tool arbor set parallel to and beneath the machine-arbor. Fig. 3 is a view showing the bottom of the attachment, with the cutting-tool arbor set in an angular position; and Fig. 4 is a vertical section of the attachment similar to Fig. 2, but showing a modification in the means for securing the two parts of the frame together.

The upper part A of the frame of the attachment is bored horizontally to fit over the arbor carried by the working spindle of the machine and bored or recessed vertically to receive the power-communicating gear. The two holes thus formed extend into and communicate with each other. The lower end of this part A is provided with a circular flange B, against which rests a similar flange B', formed on the part C of the frame, the flanged piece B being recessed to receive a corresponding projection on the flange B'. One of the flanges is provided with a suitable scale $B^3$ and the other with an index-mark to facilitate the setting of the cutting-tool arbor in different determined angular positions. This part C is bored to coincide with and form a continuation of the vertical boring of the part A, and it is also provided with caps in the usual manner for the horizontal bearings D D.

The two parts A and C are shown clamped together in Figs. 1, 2, and 3 by means of the three bolts E, which pass through a circular slot in the flange B' and enter tapped holes in the flange B. These tapped holes are arranged sufficiently close together on a complete circle on the flange B to admit of the clamping effect of the three bolts E in whatever position in the range of a full circle the part C is set in relation to the part A.

In the modification shown at Fig. 4 the two parts A and C of the frame are clamped together by means of the bolt F, which passes centrally through the vertical boring of the two parts. It is provided with a large head seating in a recess formed in the bottom of the part C and a nut on its upper end, which bears against the top of the part A.

The machine-arbor G is, as before stated, embraced by the part A of the frame, and this arbor is provided with an elongated spiral gear G', which meshes into the spiral gear H, fitted to rotate freely in the vertical hole of the frame. The upper end of this gear H, as shown at Figs. 1, 2, and 3, has a neck which passes through a hole in the top of the part A, and a collar H' is secured to the projecting part of the neck, suitable washers being placed between the collar and end of the gear and the part A of the frame to allow the free rotation of the gear without any end play. This gear H when applied to the modified construction shown at Fig. 4 is centrally bored to fit over the clamping-bolt F.

The cutting-tool arbor I, which is journaled to rotate in the bearings D D of the part C, has formed on its central part the spiral gear-teeth I', which mesh into the lower part of the spiral gear H, and its two projecting ends have shoulders and clamping-nuts I², between which rotary cutters may be secured in the usual manner, a cutter J being shown secured to one end of the arbor I.

To illustrate the application of this attachment to a machine, the upper part of an ordinary plain milling-machine is shown in outline by dotted lines at Fig. 1, showing the relation of the angularly-adjustable cutting-tool arbor to the working bed of the machine, K representing said bed, K' the head, K² the working spindle of the machine, which carries the gear-arbor G, and K³ the overhanging arm, to which the ordinary outboard center or bearing is attached. In such a case the upper part A of the frame is extended to embrace the arm K³ and be clamped rigidly thereto by the clamping-bearing A', the construction being such that the attachment may be set any desired distance from the head K' within the limits of meshing of the gear H with the elongated spiral gear G' of the spindle. In applying the attachment to other machines it will of course be readily understood what changes would have to be made in part A to adapt it to be properly adjustably secured to some suitable part of the frames of such other machines.

Other forms of gear may be used to impart motion from the machine-arbor G to the cutting-tool arbor I; but I prefer to make use of the spiral form of gears here shown, as they are very rigid, being made as parts of their arbors, work without backlash, provide readily for longitudinal and angular adjustments of their arbors relatively to one another, and avoid any nice fitting between the bearings of the two arbors.

It is unnecessary here to enter into the various advantages of being able to set the cutting-tool arbor in all angular positions throughout a full circle in relation to the feed of the machine or to detail the various kinds of work that can be performed, as such will be apparent to those skilled in the art to which this invention appertains.

I claim as my invention—

1. In a milling and gear-cutting attachment for milling and other machines, the combination of the machine-arbor provided with a spiral gear, a cutting-tool arbor provided with a spiral gear, and adapted to be set in different angular positions relative to the machine-arbor and in a horizontal plane that is parallel to the axis of the machine-arbor, a spiral gear meshing into the gear-teeth of the machine-arbor and the cutting-tool arbor and communicating motion from the machine-arbor to the cutting-tool arbor in all of its positions, a main detachable frame or arm of the machine and a frame having bearings for the machine-arbor, the cutting-tool arbor and the communicating spiral gear and adapted to be attached to the main frame or arm of the machine.

2. In a milling and gear-cutting attachment for milling and other machines, the combination of the machine-arbor, a cutting-tool arbor adapted to be set in different angular positions relative to the machine-arbor and in a horizontal plane that is parallel to the axis of the machine-arbor, means for communicating motion from the machine-arbor to the cutting-tool arbor, and a two-part frame, one part of which is adapted to be attached to a fixed part of the machine-frame and held stationary and provided with bearings for the machine-arbor and for the motion-communicating device, the other part provided with bearings in which is carried the cutting-tool arbor rotatably attached to the stationary part, and clamping-bolts which pass through a circular slot in a flange on the rotating part and enter tapped holes in a flange on the stationary part of the frame.

3. In a milling and gear-cutting attachment for milling and other machines, the combination of the machine-arbor, a cutting-tool arbor adapted to be set in different angular positions relative to the machine-arbor and in a horizontal plane that is parallel to the axis of the machine-arbor, means for communicating motion from the machine-arbor to the cutting-tool arbor, and a detachable two-part frame, one part of which is held stationary by attachment to a fixed part of the main frame of the machine and provided with bearings for the machine-arbor and for the motion-communicating device, the other part provided with bearings in which is carried the cutting-tool arbor and rotatably attached to the stationary part, circular flanges on the two parts at their juncture having an angle scale and index marked thereon, and clamping means for locking the two parts of the frame together.

4. In a milling and gear-cutting attachment for milling and other machines, the combination of the main frame or arm of the machine, the machine-arbor provided with an elongated spiral gear, a communicating spiral gear meshing into the gear of this arbor, a cutting-tool arbor having a spiral gear meshing into the communicating spiral gear, a two-part frame in one of which the cutting-tool gear has its bearing and which is rotatably attached to the other part, said other part having bearings for the machine-arbor and the communicating spiral gear and held stationary at any part of the elongated spiral gear of the machine-arbor over which it may be set by attachment to the main frame or arm of the machine.

In testimony that I claim the foregoing as my invention I have signed my name, in presence of two witnesses, this 6th day of December, 1897.

JOHN F. ARTHUR.

Witnesses:
ANNIE WILSON ARTHUR,
DANL. ARTHUR.